US012031679B2

(12) United States Patent
Hoefferer et al.

(10) Patent No.: US 12,031,679 B2
(45) Date of Patent: Jul. 9, 2024

(54) VALVE FOR CLOSING A GAS CONTAINER

(71) Applicant: iSi GmbH, Vienna (AT)

(72) Inventors: Andreas Hoefferer, Vienna (AT); Daniel Manojlovic, Vienna (AT)

(73) Assignee: iSi GmbH, Vienna (AT)

( * ) Notice: Subject to any disclaimer, the term of this patent is extended or adjusted under 35 U.S.C. 154(b) by 0 days.

(21) Appl. No.: 18/279,929

(22) PCT Filed: Mar. 29, 2022

(86) PCT No.: PCT/EP2022/058218
§ 371 (c)(1),
(2) Date: Sep. 1, 2023

(87) PCT Pub. No.: WO2022/207611
PCT Pub. Date: Oct. 6, 2022

(65) Prior Publication Data

US 2024/0151365 A1 May 9, 2024

(30) Foreign Application Priority Data

Mar. 31, 2021 (EP) .................................... 21166300

(51) Int. Cl.
*F17C 13/04* (2006.01)

(52) U.S. Cl.
CPC ...... *F17C 13/04* (2013.01); *F17C 2201/0109* (2013.01); *F17C 2201/058* (2013.01);
(Continued)

(58) Field of Classification Search
CPC .............. F17C 13/04; F17C 2201/0109; F17C 2201/058; F17C 2203/0617;
(Continued)

(56) References Cited

U.S. PATENT DOCUMENTS 4,834,266 A * 5/1989 Brewer ................ B67D 1/0832 137/212
5,413,230 A * 5/1995 Folter ........................ A23L 2/54 251/339

(Continued)

FOREIGN PATENT DOCUMENTS

CH 511 396 A 8/1971
CH 596 493 A5 3/1978

(Continued)

OTHER PUBLICATIONS

International Search Report in PCT/EP2022/058218, mailed Aug. 11, 2022.

*Primary Examiner* — Frederick C Nicolas
(74) *Attorney, Agent, or Firm* — Collard & Roe, P.C.

(57) ABSTRACT

A valve for closing a gas container includes a valve body with a continuous longitudinal bore along a longitudinal axis and a displaceably-guided valve tappet mounted therein. The valve body extends longitudinally parallel to the axis from a connection region with a connection-side end face to a fastening region with a gas-container-side end face having a smaller diameter than the connection region. The connection region has a stop face that stops a gas container base-body head when the fastening region has been inserted into an opening in the head. The valve body laterally has a double groove in the fastening region that includes two grooves that follow one another longitudinally and that a sealing lug facing away from the longitudinal axis separates to allow the head to be pressed gas-tightly with the fastening region in the double groove region when the fastening region is introduced into the head.

15 Claims, 8 Drawing Sheets

(52) U.S. Cl.
CPC ................. *F17C 2203/0617* (2013.01); *F17C 2205/0305* (2013.01); *F17C 2205/0323* (2013.01); *F17C 2205/0382* (2013.01); *F17C 2221/013* (2013.01); *F17C 2223/0123* (2013.01); *F17C 2223/036* (2013.01); *F17C 2270/0736* (2013.01)

(58) Field of Classification Search
CPC ...... F17C 2205/0305; F17C 2205/0323; F17C 2205/0382; F17C 2221/013; F17C 2223/0123; F17C 2223/036; F17C 2270/0736
See application file for complete search history.

(56) References Cited

U.S. PATENT DOCUMENTS

| | | | | |
|---|---|---|---|---|
| 5,496,141 | A | 3/1996 | Popsys | |
| 5,551,590 | A * | 9/1996 | Mazur | F24H 9/133 220/586 |
| 6,058,960 | A * | 5/2000 | Kopp | B65D 83/48 251/354 |
| 6,378,570 | B1 | 4/2002 | Shipachev et al. | |
| 2020/0360875 | A1 * | 11/2020 | Danieli | F17C 13/04 |

FOREIGN PATENT DOCUMENTS

| | | | |
|---|---|---|---|
| CN | 1067489 | A | 12/1992 |
| CN | 1212750 | A | 3/1999 |
| CN | 1453497 | A | 11/2003 |
| CN | 1774373 | A | 5/2006 |
| CN | 1902423 | A | 1/2007 |
| CN | 101466610 | A | 6/2009 |
| CN | 103415345 | A | 11/2013 |
| CN | 105121933 | A | 12/2015 |
| CN | 108571605 | A | 9/2018 |
| CN | 109562573 | A | 4/2019 |
| DE | 19955879 | A1 | 5/2001 |
| DE | 202018106532 | U1 | 2/2020 |
| EP | 0 867 656 | A1 | 9/1998 |
| EP | 1 416 218 | A2 | 5/2004 |
| EP | 0 867 656 | B1 | 12/2005 |
| FR | 33014 | E | 6/1928 |
| WO | 2004/070261 | A1 | 8/2004 |
| WO | 2010/097593 | A1 | 9/2010 |

* cited by examiner

C:

VALVE FOR CLOSING A GAS CONTAINER

CROSS REFERENCE TO RELATED APPLICATIONS

This application is the National Stage of PCT/EP2022/058218 filed on Mar. 29, 2022, which claims priority under 35 U.S.C. § 119 of European Application No. 21166300.0 filed on Mar. 31, 2021, the disclosure of which is incorporated by reference. The international application under PCT article 21(2) was not published in English.

FIELD OF THE INVENTION

The present invention relates to a valve for closing a gas container, the valve comprising a valve body having a continuous longitudinal bore along a longitudinal axis, in which longitudinal bore a displaceably guided valve tappet is mounted, wherein the valve body extends in a longitudinal direction parallel to the longitudinal axis from a connection region having a connection-side end face to a fastening region with a gas container-side end face, wherein the fastening region has a smaller diameter than the connection region and the connection region has a stop surface in order to provide a stop for a base body head of the gas container when the fastening region is inserted into the base body head through an opening thereof.

DESCRIPTION OF THE PRIOR ART

Gas containers filled with gas can be connected in a gas-tight manner to a device, such as a soda siphon, a whipping cream siphon, or a pressure regulator, to provide an appropriate gas supply to the siphon or device.

It is known to produce carbonated beverages, in particular soda, as well as whipped cream for the needs of a user by means of a siphon cooperating with a corresponding gas container, wherein the water is enriched with carbon dioxide (CO2) or the cream with nitrous oxide (N2O) from the gas container. Furthermore, gas containers filled with nitrogen (N2) or argon (Ar) are also becoming increasingly important for a wide range of applications, especially with siphons or siphon bottles.

Since high pressures are required to ensure optimum results, there is a risk of uncontrolled bursting of the gas container. Similarly, the use of any valves, which in the case of commercially available capsule-shaped gas containers are each arranged in the area of a gas container neck, involves the risk of the valve or its valve body being forced out of the gas container by the high pressures. Likewise, if the gas container neck is weakened by the arrangement of the valve, ductile bursting may occur, especially at temperatures higher than 130° C., resulting in possible injuries to the user.

In this respect, EP 0 867 656 B1 discloses a pressurized gas capsule having a valve body, with the valve body being pressed to the gas container only via a simple groove, so that at high pressure there is a risk of the valve body being pressed out of the gas container. To limit the freedom of movement of a valve tappet mounted for displacement along a longitudinal axis in a continuous longitudinal bore, the valve body has projections projecting radially inwards only in a plane normal to the longitudinal axis, but these projections do not perfectly ensure a secure pressure-based movement or even retention of the valve tappet.

OBJECT OF THE INVENTION

It is therefore an object of the present invention to create a valve for a gas container which avoids the disadvantages mentioned. In particular, in the valve according to the invention, even at a high pressure of the gas in the gas container, a safeguard against a possible pressing out or pushing out of the valve or a valve body of the valve from the gas container is to be ensured, wherein preferably additionally a secured pressure-based movement as well as holding of a valve tappet displaceably mounted in the valve body is to be ensured.

SUMMARY OF THE INVENTION

In order to solve the aforementioned problem, in a valve for closing a gas container, the valve comprising a valve body having a continuous longitudinal bore along a longitudinal axis, in which longitudinal bore a displaceably guided valve tappet is mounted, wherein the valve body extends in a longitudinal direction parallel to the longitudinal axis from a connection region with a connection-side end face to a fastening region with a gas container-side end face, wherein the fastening region has a smaller diameter than the connection region and the connection region has a stop face in order to provide a stop for a base body head of the gas container when the fastening region is inserted into the base body head through an opening in the base body head, it is provided according to the invention that the valve body has a double groove on the circumferential surface in the fastening region, wherein the double groove comprises two individual grooves following one another in the longitudinal direction, which are separated from one another by a sealing lug facing away from the longitudinal axis, in order to permit gas-tight pressing of the base body head with the fastening region in the region of the double groove when the fastening region with the double groove is pushed into the base body head.

The terms “connection side” and “gas container side” are to be understood with regard to the intended use. Likewise, one could speak of a first end face (instead of an end face on the connection side) and a second end face (instead of an end face on the gas container side).

In other words, two individual grooves lying one behind the other are arranged on the circumferential surface of the valve body in the fastening region in such a way that an elevation is formed between them. This elevation forms the sealing lug through which the valve body can be connected in a gas-tight manner to the gas container or its gas container neck or base body head by means of two pressings formed one behind the other. This means that double pressing of the valve body to the gas container is achieved by means of a forming process, preferably a roller burnishing process (known manufacturing process for forming rotationally symmetrical semi-finished products, wherein in the case of tubular semi-finished products, circumferential beads or grooves are produced by controlled feeding of internal and/or external shape-determining tools and by continuous rolling on the workpiece), whereby any bursting of the gas container, in particular in the area of the gas container neck, or any pressing of the valve body out of the gas container neck or the base body head at more than 500 bar can be reliably avoided, preferably up to a maximum pressure of 550 bar.

In detail, such an arrangement ensures that the gas container maintains its integrity or shape at a pressure generated at a maximum permissible fill factor of 0.75 kg/l (for carbon dioxide (CO2) or nitrous oxide (N2O)) and a temperature of about 130° C. At the same time, the double groove takes optimum account of the limited installation space available.

With regard to the connection region, it should be noted that this extends in the longitudinal direction from an initial region (comprising the connection-side end face) to an end region (comprising the stop face). The diameter of the connection region is larger than the diameter of the fastening region, especially in its end region, which typically applies to the entire fastening region.

Each individual groove has an individual groove base. The sealing lug projects beyond these individual groove bases.

As mentioned, a reliable press fit between the base body head and the fastening region in the area of the double groove is made possible when the fastening region together with the double groove is inserted into the base body head. Preferably, the fastening region is inserted completely or to such an extent into the base body head that the base body head contacts the stop surface acting as a stop.

In a preferred embodiment, the continuous longitudinal bore comprises at least three bore sections with at least two different diameters. This enables different functionalization of the bore sections, with larger diameters being advantageous, for example, with regard to unhindered gas flow and a smaller diameter proving advantageous for the mounting of the valve tappet.

In a particularly preferred embodiment of the valve according to the invention, it is provided that at least a first bore section is arranged in the connection region and that at least a second and third bore section are arranged in the fastening region. This arrangement not only proves to be particularly favorable in terms of manufacturing technology, but can also be advantageous with regard to the different functionality of the individual bore sections. In particular, if, for example, the bore section provided for the mounting of the valve tappet is arranged in the fastening region, a mechanically extremely stable bearing is ensured if the fastening region is inserted into the base body head of the gas container and is press-fitted to it in a gas-tight manner.

It is obviously also conceivable that more than one first bore section are arranged in the connection region and/or that more than two bore sections (or more than the second bore section and the third bore section, e.g. a fourth or a fourth and a fifth bore section) can be provided in the fastening region.

In accordance with the above, in a particularly preferred embodiment of the valve according to the invention, it is provided that the second bore section lying between the first bore section and the third bore section has a smaller diameter than the first bore section and the third bore section, wherein the valve tappet is displaceably mounted in the second bore section.

In a preferred embodiment of the valve according to the invention, it is provided that the valve body has a first snap lug arrangement in the longitudinal bore in the fastening region, preferably in a third bore section of the longitudinal bore, by means of which first snap lug arrangement a sectional narrowing of the longitudinal bore in the fastening region, preferably in the third bore section of the longitudinal bore, is ensured, wherein the first snap lug arrangement has at least one bulge facing towards the longitudinal axis. This first snap lug arrangement serves to ensure a secured pressure-based movement as well as retention of the valve tappet in the valve body during a filling of the gas container with gas. Specifically, the valve tappet can be moved longitudinally along the longitudinal axis from a closed position, in which the valve or longitudinal bore is sealed in a gas-tight manner by the valve tappet, to a filling position. In the filling position, the valve tappet releases the valve or the longitudinal bore for gas, so that gas can flow through the valve or the longitudinal bore, with the valve tappet abutting the first snap lug arrangement. This means that the first snap lug arrangement prevents further movement of the valve tappet in the longitudinal direction by positive locking.

However, by applying a sufficiently large force in the longitudinal direction—or in principle also against the longitudinal direction—the valve tappet can be pushed at least in sections over the first snap lug arrangement or over its at least one bulge, wherein the at least one bulge recedes elastically away from the longitudinal axis. This elasticity can be ensured by the choice of material of the valve body.

In order to ensure both the greatest possible freedom of movement and retention of the valve tappet, it is provided in a particularly preferred embodiment of the valve according to the invention that the first snap lug arrangement comprises three bulges which are arranged at least in sections in a plane normal to the longitudinal axis. This sectional constriction caused by the three bulges results in a particularly reliable positive positional fixing of the valve tappet.

An angular distance of the bulges from one another allows unhindered gas flow when the valve tappet is in the filling position and is in contact with the first snap lug arrangement. In a particularly preferred embodiment of the valve according to the invention, it is provided that the three bulges of the first snap lug arrangement are arranged, preferably symmetrically, at an angular distance of 120° from one another in each case, wherein the angular distance is measured around the longitudinal axis. This guarantees an unhindered gas flow in a particularly reliable manner, so that the gas can flow between the valve tappet, the bulges and an inner wall of the longitudinal bore when filling the gas container as well as when emptying the gas container.

In a particularly preferred embodiment of the valve according to the invention, it is provided that the valve body has a second snap lug arrangement in the longitudinal bore in the fastening region, preferably in the third bore section, between the first snap lug arrangement and the gas container-side end face, by means of which second snap lug arrangement a further sectional narrowing of the longitudinal bore in the fastening region, preferably in the third bore section, is ensured, wherein the second snap lug arrangement has at least one bulge facing towards the longitudinal axis. This second snap lug arrangement serves for secure pressure-based movement as well as retention of the valve tappet in the valve body during emptying of the gas container, wherein the gas flows from the gas container into a device, preferably into a siphon. This means that, in this emptying position, the valve tappet is longitudinally slid in a sectional manner over the first snap lug arrangement such that a section of the valve tappet is disposed between the first and second snap lug arrangements. Further movement in the longitudinal direction beyond the second snap lug arrangement is basically prevented by positive locking.

However, by applying a sufficiently large force in the longitudinal direction—or in principle also against the longitudinal direction—the valve tappet can be pushed at least in sections over the second snap lug arrangement or over its at least one bulge, wherein the at least one bulge recedes elastically away from the longitudinal axis. This elasticity can be ensured by the choice of material of the valve body.

Accordingly, when the valve is assembled, the valve tappet can be pushed against the longitudinal direction over the second snap lug arrangement as well as over the first snap lug arrangement.

In order to ensure the highest possible degree of freedom of movement and retention of the valve tappet, it is provided in a particularly preferred embodiment of the valve according to the invention that the second snap lug arrangement comprises three bulges which are arranged at least in sections in a plane normal to the longitudinal axis. This sectional constriction caused by the three bulges results in reliable positive positional fixing of the valve tappet.

An angular distance of the bulges of the second snap lug arrangement from one another allows unobstructed gas flow when the valve tappet is in the emptying position and is in contact with the second snap lug arrangement. In a particularly preferred embodiment of the valve according to the invention, it is provided that the three bulges of the second snap lug arrangement are arranged, preferably symmetrically, at an angular distance of 120° from one another, wherein the angular distance is measured around the longitudinal axis. This particularly reliably guarantees an unhindered gas flow, so that the gas can flow between the valve tappet, the bulges of the second snap lug arrangement and an inner wall of the longitudinal bore both when the gas container is emptied and when the gas container is filled.

In order to ensure an optimum gas flow that is as unobstructed as possible when the valve tappet is in the emptying position, it is provided in a particularly preferred embodiment of the valve according to the invention that the bulges of the first and second snap lug arrangements, as seen along the longitudinal axis, are arranged congruent with each other or rotated by 60° with respect to each other.

In order to prevent the valve tappet from sliding out of the valve body, in particular during filling of the gas container, it is provided in a particularly preferred embodiment of the valve according to the invention that the valve tappet has a thickening which is directed towards the container-side end face, extends conically at least in sections and has, at least in sections, in particular in an end region facing towards the gas container-side end face, a maximum diameter which is greater than the diameter of the sectional constriction formed by the first snap lug arrangement. As already explained above, this defines in particular the filling position, i.e. when the tappet moves from the closed position in the longitudinal direction until it is in contact with the first snap lug arrangement.

Similarly, in a particularly preferred embodiment of the valve according to the invention, it is provided that the maximum diameter of the thickening is larger than the diameter of the further sectional constriction formed by the second snap lug arrangement. This defines, as already explained above, in particular the emptying position, i.e. when the valve tappet moves further in longitudinal direction from the filling position (at least with a section having the maximum diameter) over the first snap lug arrangement until it abuts against the second snap lug arrangement.

This ensures secure pressure-based movement and retention of the valve tappet, which is displaceably mounted in the valve body. Accordingly, the valve tappet serves on the one hand as a sealing element to the valve body and on the other hand as an opening element.

It is important to note that the maximum diameter of the valve tappet is smaller than a diameter of an opening cross-section of the longitudinal bore in the fastening region or the third bore section. This allows gas to flow past between the thickening and the inner wall of the longitudinal bore or the inner wall of the third bore section.

In a preferred embodiment, the valve tappet is made of metal, preferably steel or stainless steel or brass, or of ceramic.

In a particularly preferred embodiment of the valve according to the invention, it is provided that the valve body is made of a high-temperature-resistant plastic, in particular polyethersulfone (PES) or polysulfone (FSU) or polyetheretherketone (PEEK) or polyphenylene sulfide (PPS) or polyphenylsulfone (PPSU) or polyetherimide (PEI). In interaction with the valve tappet, optimum tightness can thus be achieved, while stability at temperatures of at least about 130° C. is also ensured.

Further, there is sufficient elasticity of the material to implement the first and second snap lug arrangements with elastic protrusions integral with the valve body.

Analogous to the above, a gas container having a valve according to the invention is provided, the gas container comprising a base body with a base body head having an opening, wherein the base body forms, at least in sections, an inner volume for receiving gas, wherein the fastening region with the double groove is inserted or pressed into the base body head through the opening, preferably until the stop surface is contacted by the base body head, and wherein the base body head is pressed in a gas-tight manner with the fastening region in the region of the double groove. Here, the connection region of the valve body serves to connect the gas container filled with gas to a device, preferably to a cream or soda siphon.

Thus, a gas container is created, which is not designed to be refillable according to ÖNORM EN 16509, which concerns small transportable cylinders, wherein it is a so-called disposable gas capsule. Economic disadvantages due to high costs of refillable capsules, which are based on considerably higher normative requirements, such as individual labeling, recurring individual testing or ensuring food purity during refilling, etc., are thus reliably avoided.

BRIEF DESCRIPTION OF THE FIGURES

The invention will now be explained in more detail by means of an exemplary embodiment. The figures are exemplary and are intended to illustrate the idea of the invention, but in no way to restrict it or even to reproduce it conclusively. Further advantageous designs, details and further developments of the invention are also to be taken from the figures, wherein.

DETAILED DESCRIPTION OF THE PREFERRED EMBODIMENTS

Figure 1:
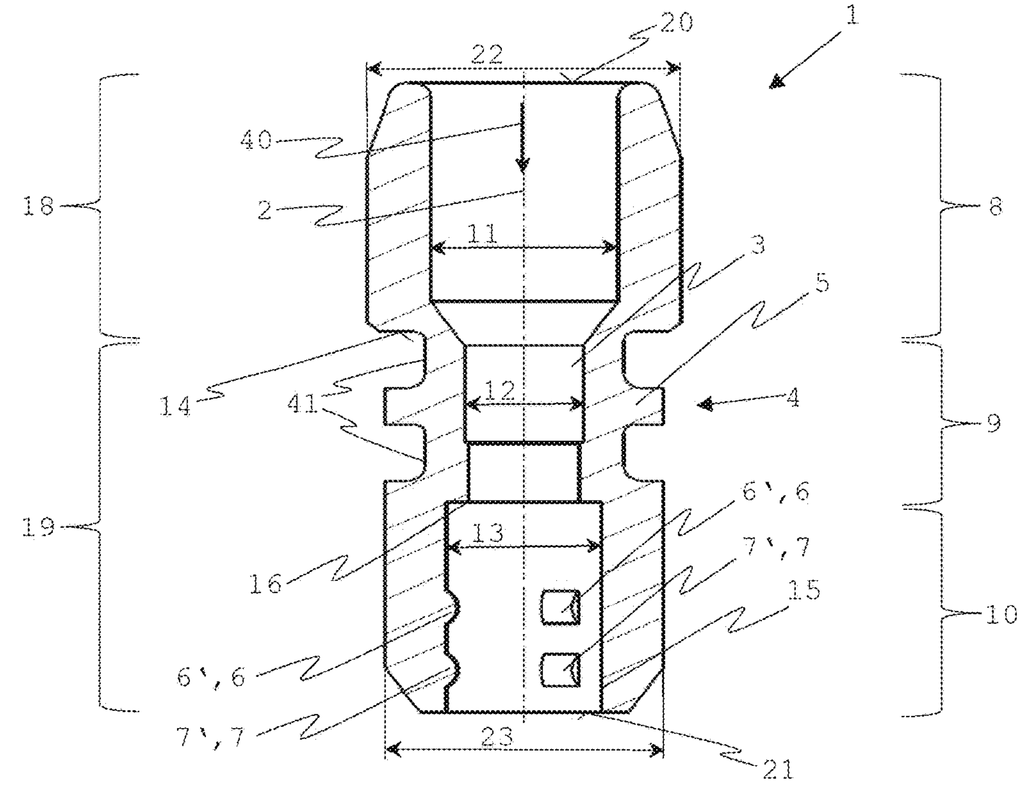
FIG. 1 shows a sectional view of a valve body of a valve according to the invention.

FIG. 1 shows a valve 39 having a valve body 1 for closing a gas container 24, the valve body 1 comprising a continuous longitudinal bore 3 along a longitudinal axis 2, in which longitudinal bore 3 a displaceably guided valve tappet 17 is mounted, wherein the valve body 1 extends in a longitudinal direction 40 extending parallel to the longitudinal axis 2 from a connection region 18 with a connection-side end face 20 to a fastening region 19 with a gas container-side end face 21. The fastening region 19 has a diameter 23 that is smaller than a diameter 22 of the connection region 18 opposite the fastening region 19, and the connection region 18 in turn has a stop surface 14 to provide a stop for a base body head 27 of the gas container 24 when the fastening region 19 is inserted into the base body head 27 through an opening 28 thereof.

In this connection, it is provided in accordance with the invention that the valve body 1 has a double groove 4 on the circumferential surface in the fastening region 19, wherein the double groove 4 comprises two individual grooves 41 which follow one another in the longitudinal direction 40 and are separated from one another by a sealing lug 5 facing away from the longitudinal axis 2, in order to permit gas-tight pressing of the base body head 27 with the fastening region 19 in the region of the double groove 4 when the fastening region 19 with the double groove 4 is pushed into the base body head 27. In other words, two individual grooves 41 lying one behind the other are arranged in the fastening region 19 on the circumferential surface of the valve body 1 in such a way that a sealing lug 5 in the form of an elevation is formed therebetween, as a result of which any pressing of the valve body 1 out of the gas container 24 can be avoided even at an increased pressure.

Figure 2:
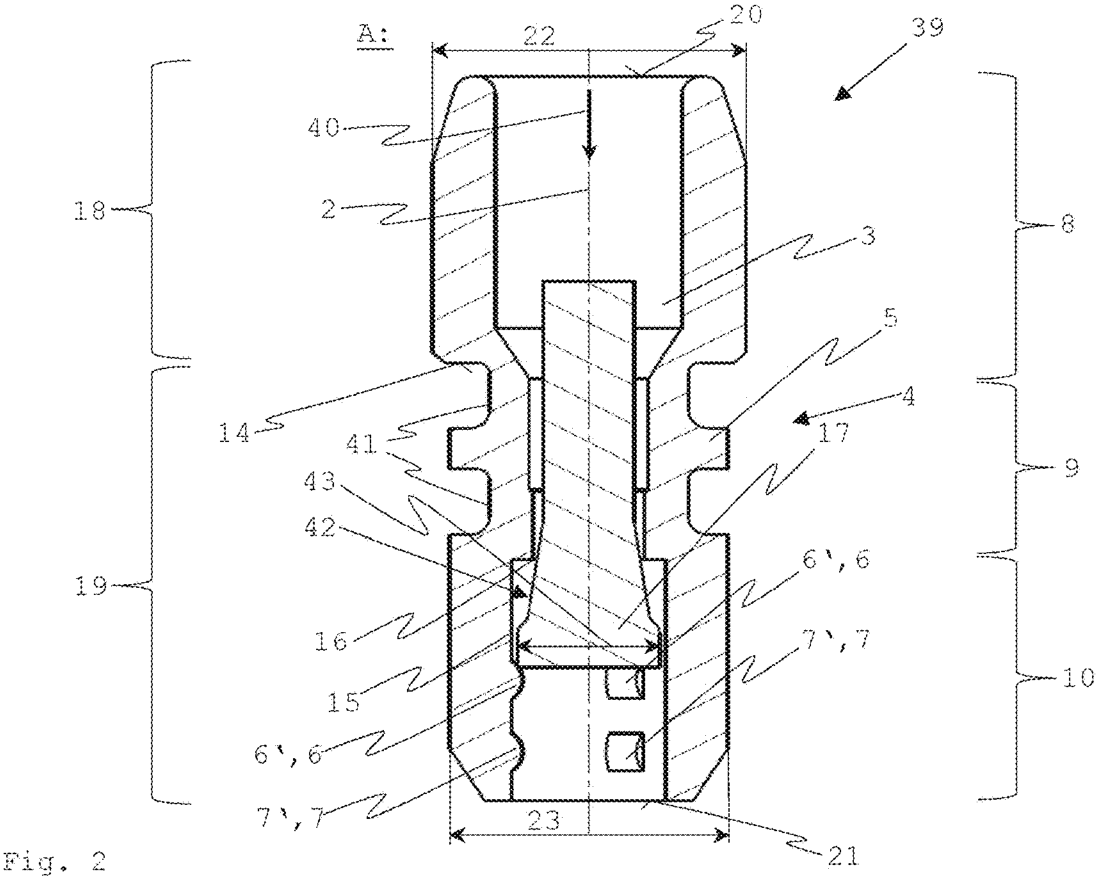
FIG. 2 shows a sectional view analogous to FIG. 1, wherein a displaceably guided valve tappet is mounted in the valve body.

It can be seen in FIG. 1 and FIG. 2 that in the exemplary embodiment shown, the continuous longitudinal bore 3 is composed of at least a first bore section 8, a second bore section 9 and a third bore section 10, wherein at least two of the three bore sections 8, 9, 10 have different diameters 11, 12, 13. In detail, the first bore section 8 is arranged predominantly in the connection region 18 and the second bore section 9 and third bore section 10 are arranged predominantly in the fastening region 19.

To enable both optimum gas filling and gas draining, the second bore section 9 located between the first bore section 8 and the third bore section 10 has a smaller diameter 12 than the first bore section 8 and the third bore section 10, with the valve tappet 17 being displaceably mounted in the second bore section 9.

Furthermore, in the illustrated exemplary embodiment, to ensure a secured pressure-based movement as well as retention of the valve tappet 17 in a specific position for gas filling, which is referred to below as filling position A, a first snap lug arrangement 6 with three bulges 6' facing towards the longitudinal axis 2 is arranged in the third bore section 10, whereby a sectional narrowing of the third bore section 10 is provided. The three bulges 6' of the first snap lug arrangement 6 are arranged at least in sections in a plane normal to the longitudinal axis 2. In order to ensure as uniform a narrowing as possible, the three bulges 6' are arranged symmetrically within the third bore section 10 with an angular spacing of 120° from one another in each case, with the angular distance being measured around the longitudinal axis 2, cf. in particular FIG. 4, which shows a sectional view X-X from FIG. 3, wherein a thickening 42 (cf. FIG. 2) of the valve tappet 17 extending in the shape of a cone partially covers the three bulges 6' of the first snap lug arrangement 6.

In order to ensure safe gas draining, in the illustrated exemplary embodiment the third bore section 10 between the first snap lug arrangement 6 and the gas container-side end face 21 has a second snap lug arrangement 7 with three bulges 7' facing towards the longitudinal axis 2, by means of which a further sectional constriction of the third bore section 10 is ensured. This further sectional constriction serves to fix the position of the valve tappet 17 between the first snap lug arrangement 6 and the second snap lug arrangement 7 in a emptying position C, see also FIG. 10.

The bulges 7' are also arranged at least in sections in a plane normal to the longitudinal axis 2. To ensure the most uniform narrowing possible, the three bulges 7' are arranged symmetrically at an angular distance of 120° from each other, wherein the angular distance is measured around the longitudinal axis 2.

FIGS. 1 to 11 clearly show that, in the exemplary embodiment shown, the bulges 6' of the first snap lug arrangement 6 and the bulges 7' of the second snap lug arrangement 7 are arranged congruently as seen along the third bore section 10 or the longitudinal axis 2.

In detail, FIG. 2 shows that the valve tappet 17 has the at least partially conical thickening 42 directed towards the gas container-side end face 21, with which a gas-tight connection can be formed along a circular sealing edge 16 of the second bore section 9, in which the valve tappet 17 is displaceably mounted.

Figure 4:
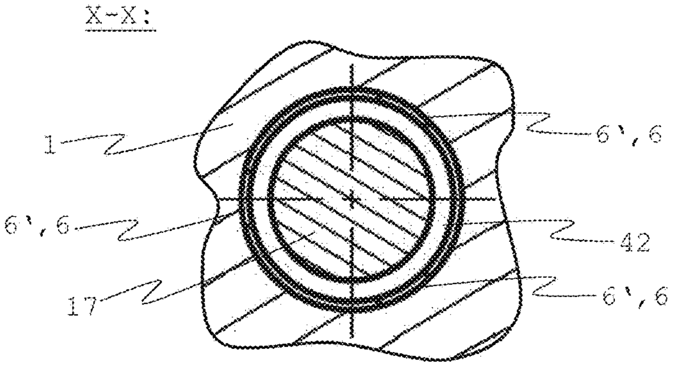
FIG. 4 shows an enlarged section of a cross-sectional view X-X from FIG. 3.

It can be seen in both FIG. 2 and FIG. 4 that the thickening 42 of the valve tappet 17, which extends at least in sections in a conical shape, has a maximum diameter 43 in an end region facing the end face 21 on the gas container side, which is larger than the diameter of the sectional constriction formed by the first snap lug arrangement 6. Furthermore, the maximum diameter 43 is also larger than the diameter of the further sectional constriction formed by the second snap lug arrangement 7. This ensures both a secure guiding and holding or fixing of the valve tappet 17 in the filling position A, a closing position B as well as the emptying position C. The maximum diameter 43 is smaller than a diameter 13 of an opening cross-section 15 of the third bore section 10, in order to allow both a smooth movement of the valve tappet 17 and an unobstructed gas flow between the valve tappet 17 and an inner wall of the third bore section 10.

To ensure tightness (when the valve 39 is closed), either the valve tappet 17 should be made of a harder material than the valve body 1 or the valve body 1 should be made of a harder material than the valve tappet 17, which is why in the embodiment shown the valve tappet 17 is made of metal, preferably steel or stainless steel or brass, or of ceramic, while the valve body 1 is formed of a high-temperature-resistant plastic, in particular of polyethersulfone (PES) or polysulfone (PSU) or polyetheretherketone (PEEK) or polyphenylene sulfide (PPS) or polyphenylsulfone (PPSU) or polyetherimide (PEI).

FIGS. 3 to 11 show a gas container 24 formed with the valve 39 explained above, wherein the gas container 24 comprises a base body 26 with the base body head 27 having the opening 28. Here, the base body 26 forms, at least in sections, an inner volume for receiving gas 29. The valve body 1 is inserted with its fastening region 19 into the base body head 27, wherein at least in the region of the base body head 27 the fastening region 19 of the valve body 1 is arranged such that the stop surface 14 of the valve body 1 rests on an end surface 30 of the base body head 27.

Figure 3:
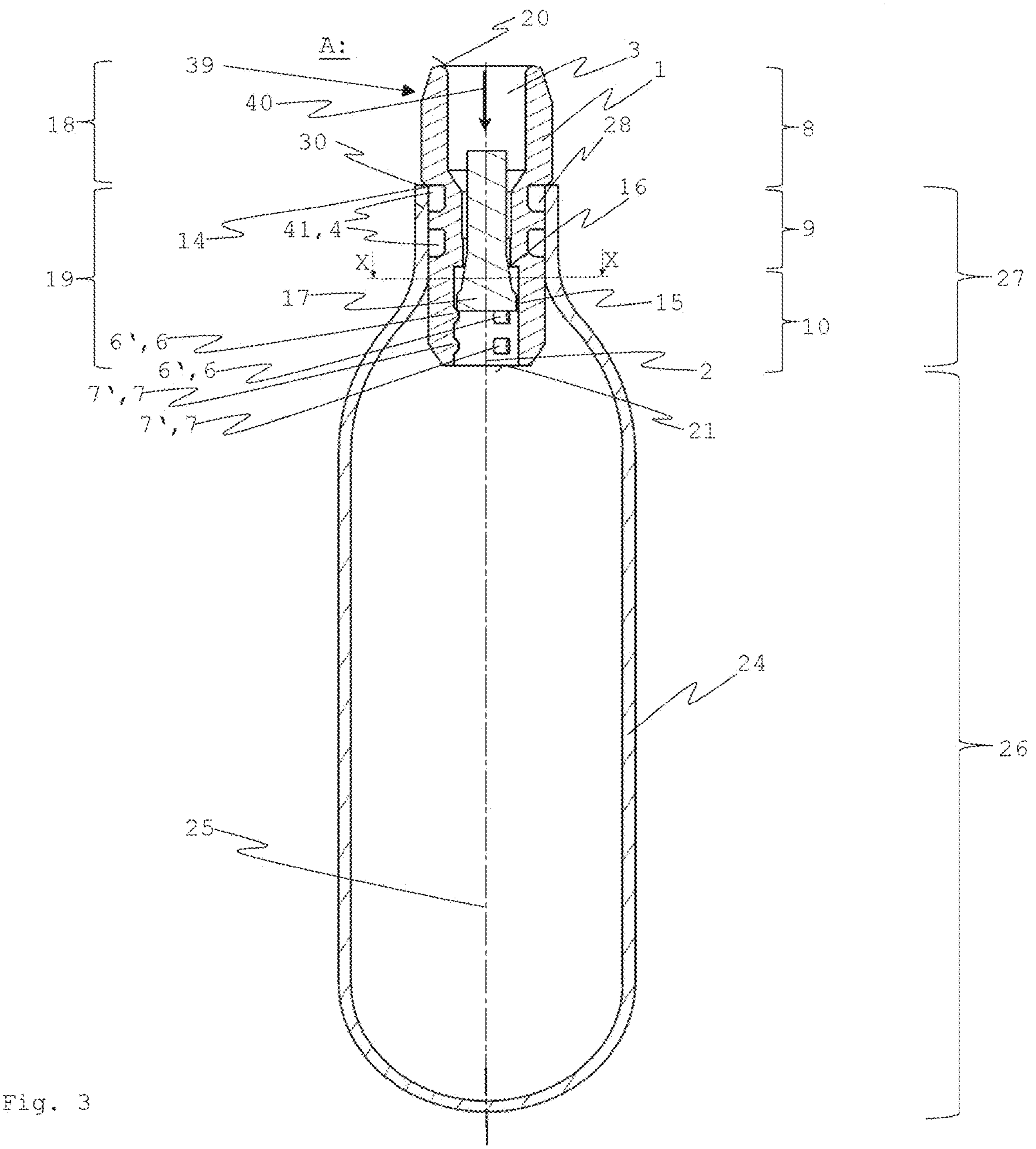
FIG. 3 shows a sectional view of a gas container with the valve according to the invention, wherein the valve body is inserted or pressed into the gas container, but not yet pressed together with it.

Here, it can also be seen in FIG. 3 that in a first step, the valve body 1 is pushed or pressed into the base body head 27 through the opening 28 until the stop surface 14 of the valve body 1 rests on the end surface 30 of the base body head 27.

Figure 5:
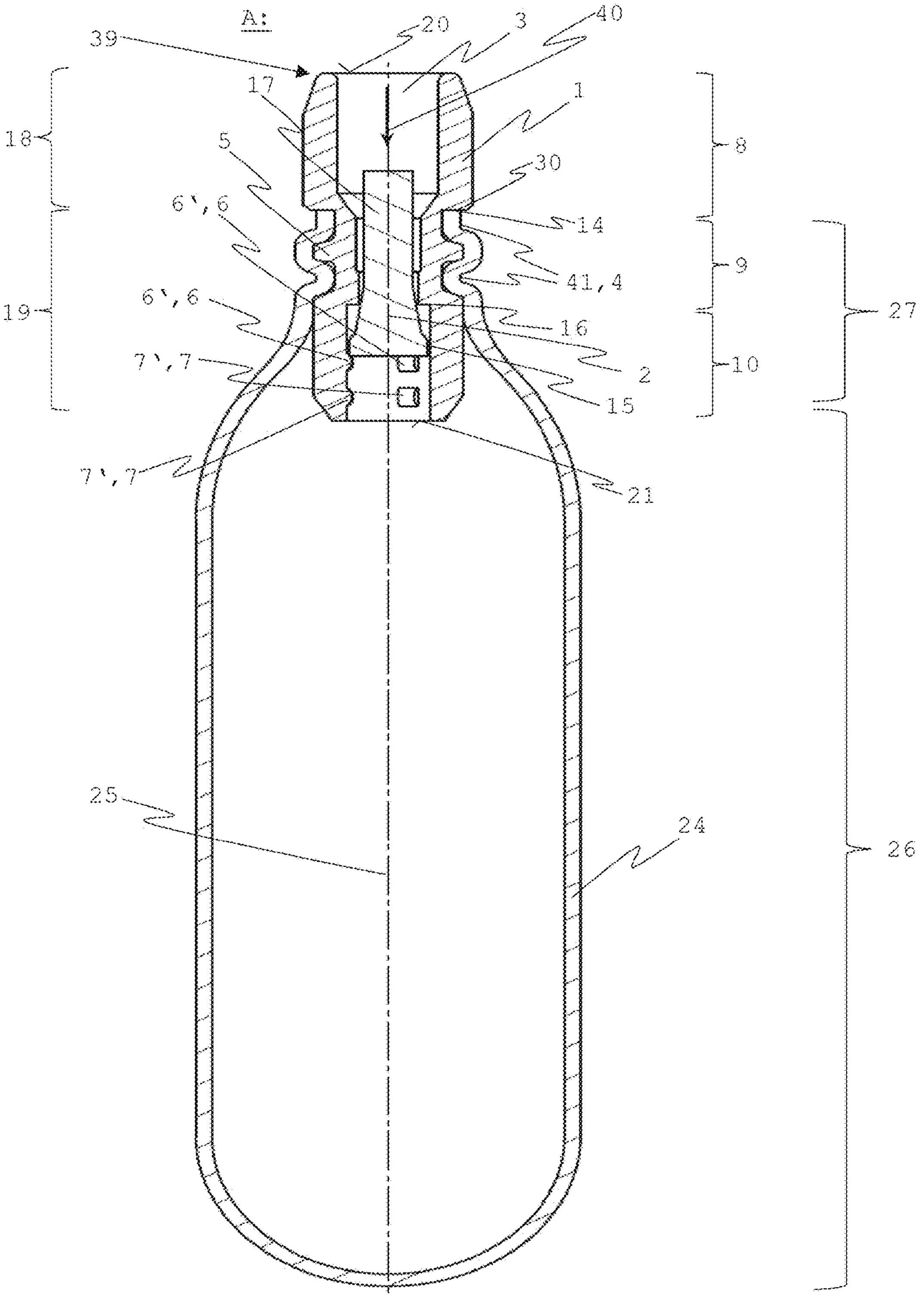
FIG. 5 shows a sectional view of the gas container with the valve according to the invention, wherein the valve body is pressed to the gas container.

FIG. 5 shows the finished empty gas container 24, wherein the valve body 1 is formed gas-tight with the base body head 27 by means of pressing around the sealing lug 5 of the double groove 4. In this case, the connection region 18 of the valve body 1 protrudes outwardly from the base body head 27, with the longitudinal axis 2 of the valve body 1 being aligned, i.e. in line, with a longitudinal axis 25 of the gas container 24.

Figure 6:
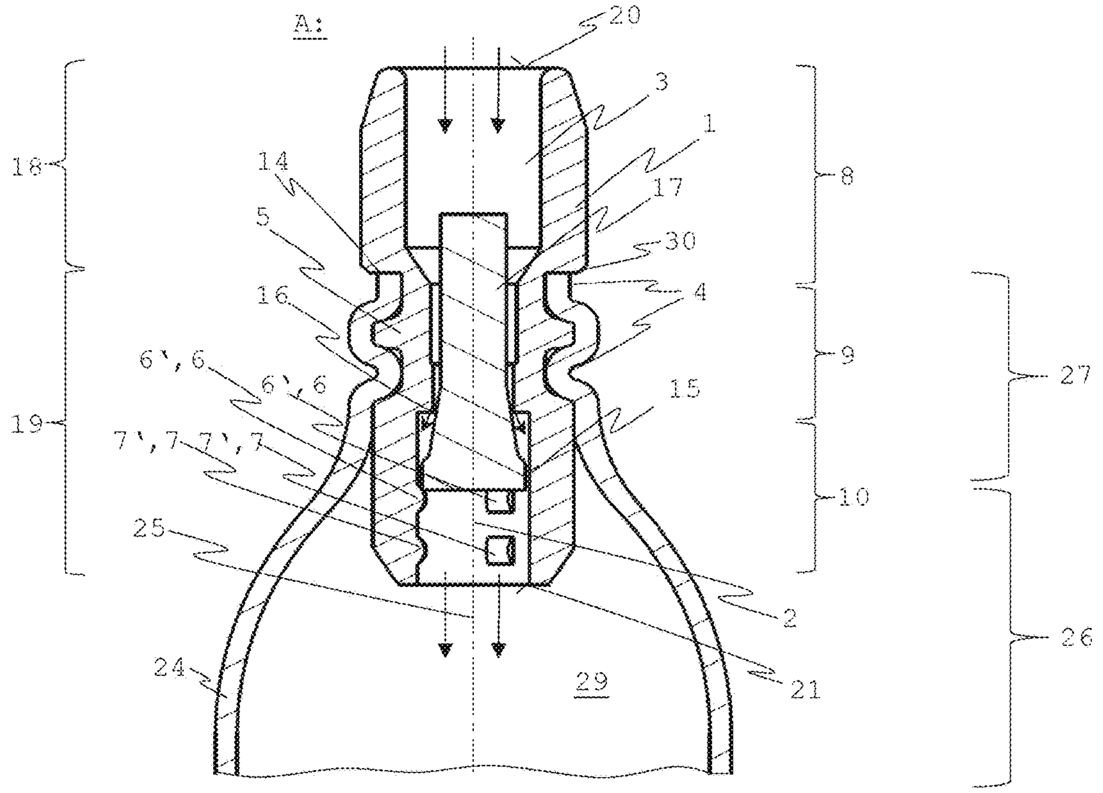
FIG. 6 shows a detailed view of a sectional view of the gas container with the valve according to the invention, wherein the valve tappet is arranged in a filling position.
Figure 7:
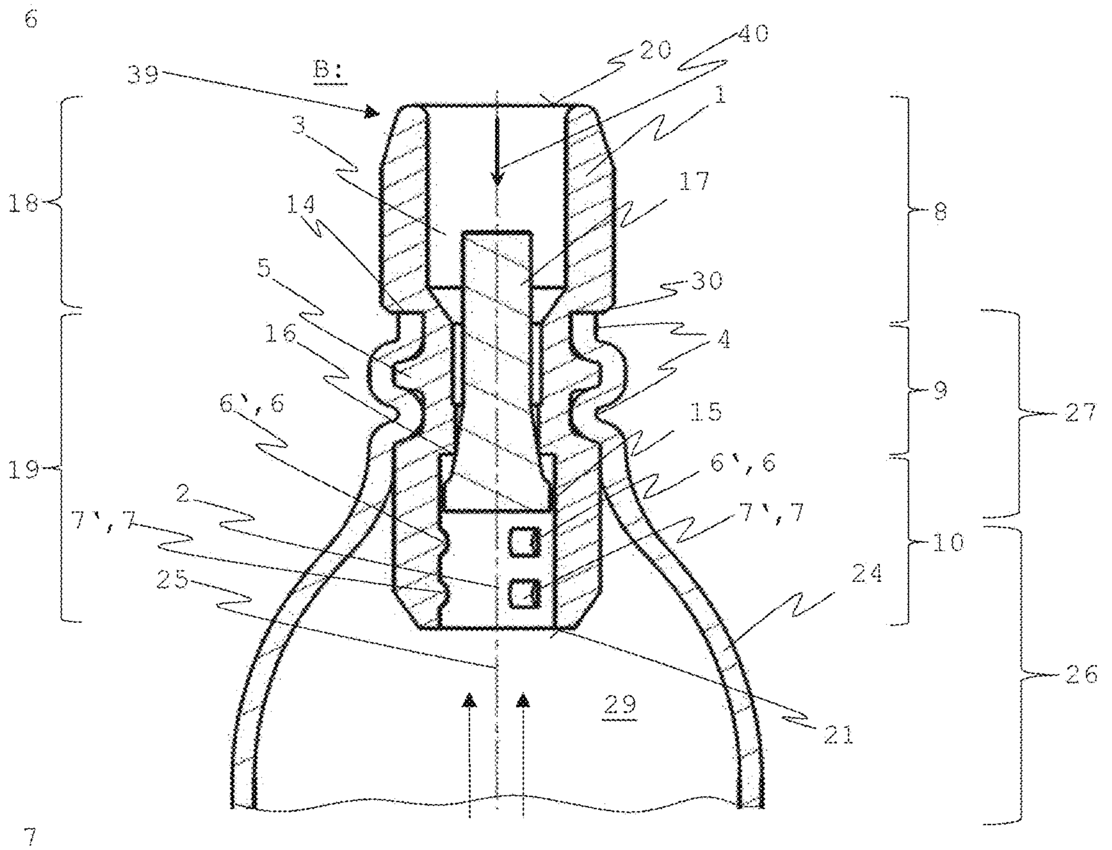
FIG. 7 shows a detailed view of a sectional view of the gas container with the valve according to the invention, wherein the valve tappet is arranged in a closed position.

FIG. 6 shows the valve tappet 17 of the valve 39 of the gas container 24 in the filling position A, wherein the following steps are required to fill the gas container 24 with the gas 29:

1. Arrangement of the valve tappet 17 arranged in the valve body 1 of the gas container 24 with the thickening 42 having the maximum diameter 43 on the base body head side above or, as viewed in the longitudinal direction 40, in front of the first snap lug arrangement 6, wherein the valve tappet 17 is in contact with the bulges 6 of the connection-side first snap lug arrangement 6 in such a way that a gap is ensured between the sealing edge 16 and the conical thickening 42 of the valve tappet 17. The valve tappet 17 is thus in the filling position A, cf. FIG. 6.
2. Inflow of the gas 29 via the connection region 18 of the valve body 1 through the gap into the base body 26 of the gas container 24 (according to the flow lines drawn in FIG. 6), wherein a force acting on the valve tappet 17 and directed in the longitudinal direction 40 is absorbed by means of the first snap lug arrangement 6, which force is exerted on the valve tappet 17 by the flowing gas 29 during the filling process.
3. When a predefined filling pressure is reached, the valve tappet 17 is moved outwards (against the longitudinal direction 40) in the direction of the base body head 27, closing the gap between the sealing edge 16 of the valve body 1 and the gas container-side conical thickening 42 of the valve tappet 17, so that the valve tappet 17 is arranged in the closed position B, see FIG. 7.

Specifically, in the third step, the valve tappet 17 is moved based on a pressure difference inside the base body 26 of the gas container 24 to atmospheric pressure, according to the drawn flow lines.

Figure 8:
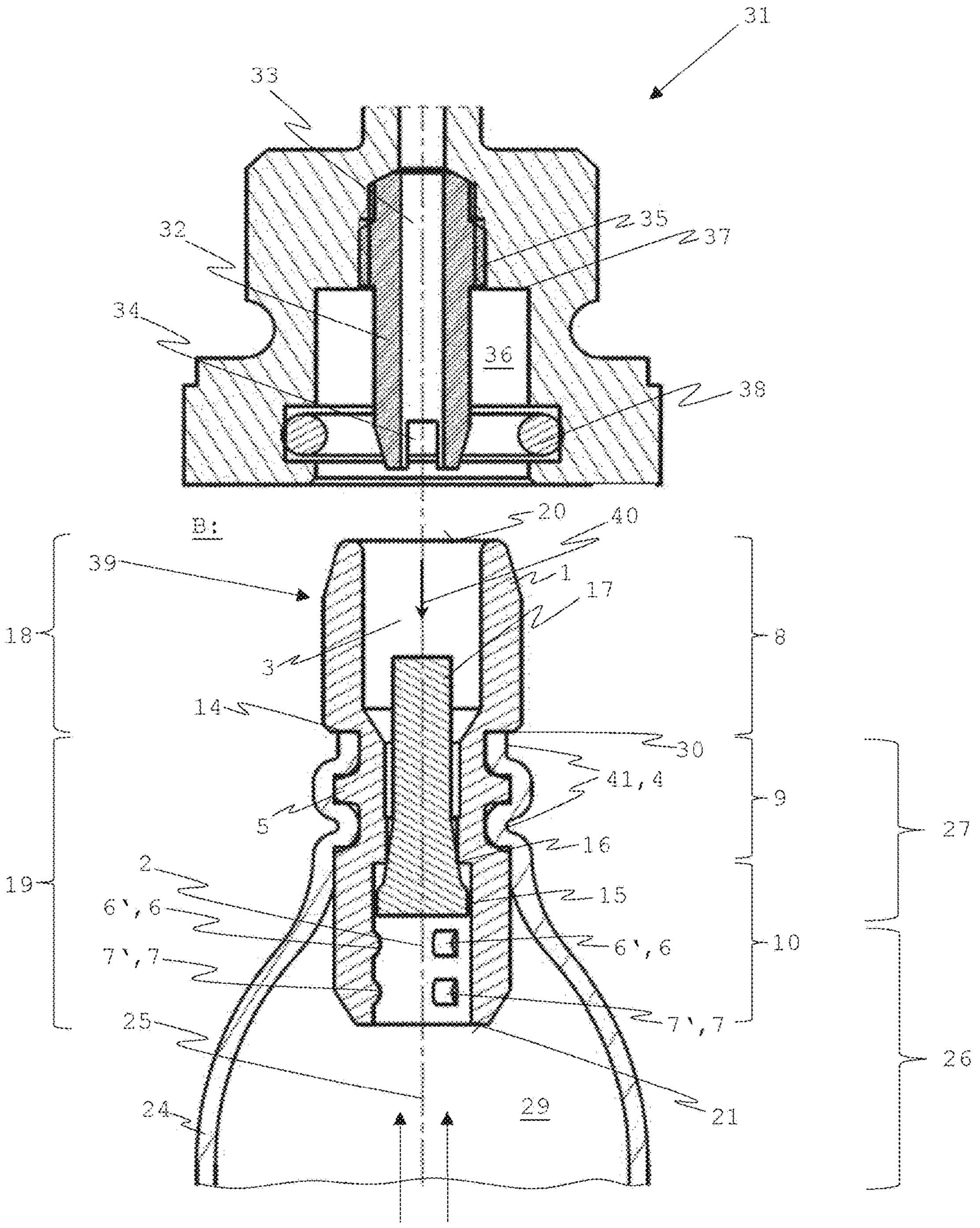
FIG. 8 shows a detailed view of a sectional view of the gas container with the valve according to the invention, as in FIG. 7, wherein an inlet valve of a device for gassing a fluid with the gas from the gas container is arranged above the gas container.
Figure 9:
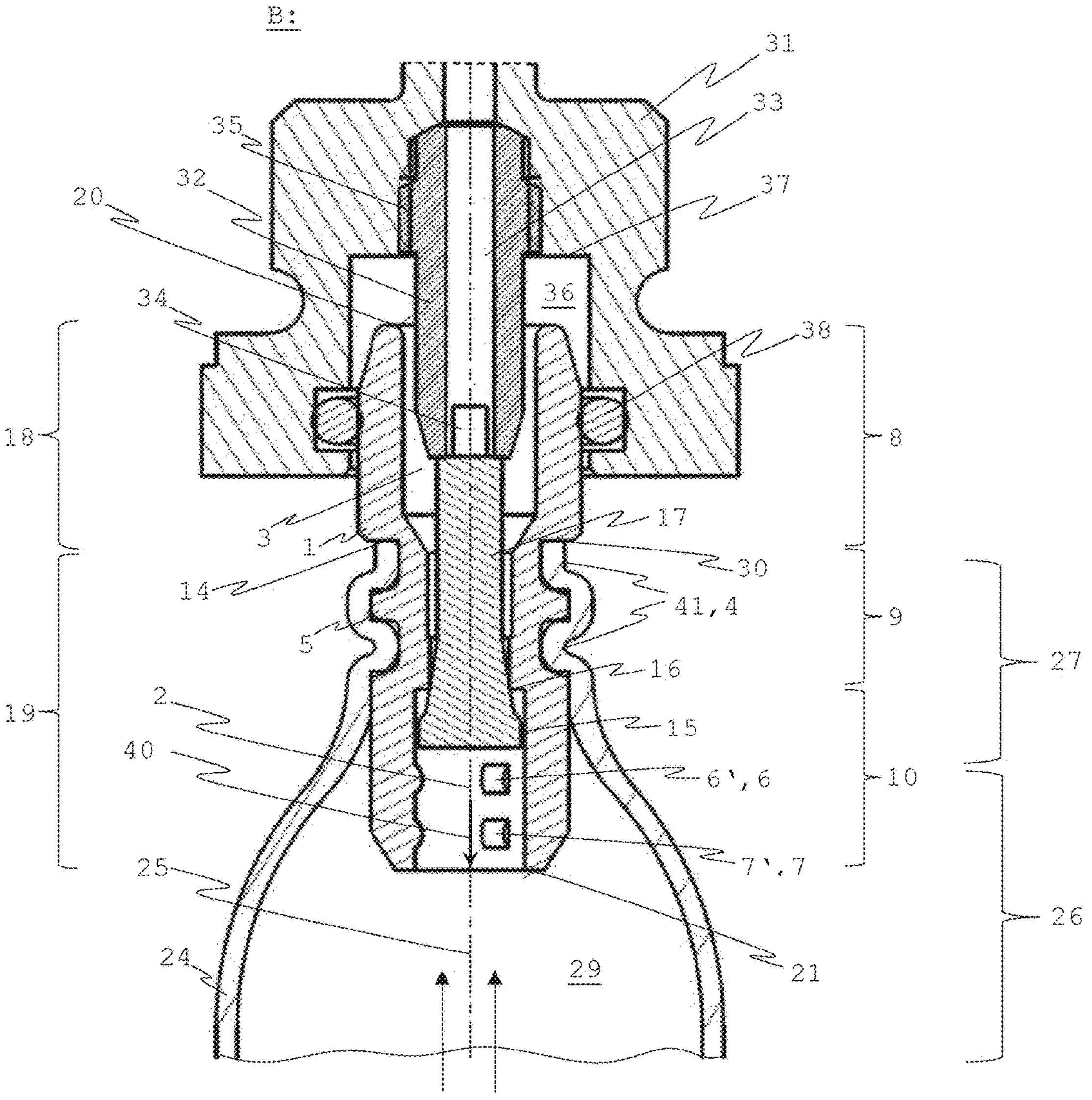
FIG. 9 shows a detailed view of a sectional view of the gas container with the valve according to the invention as in FIG. 7, wherein a connection region of the valve body is at least partially arranged in a gas container receptacle of the inlet valve of FIG. 8.
Figure 10:
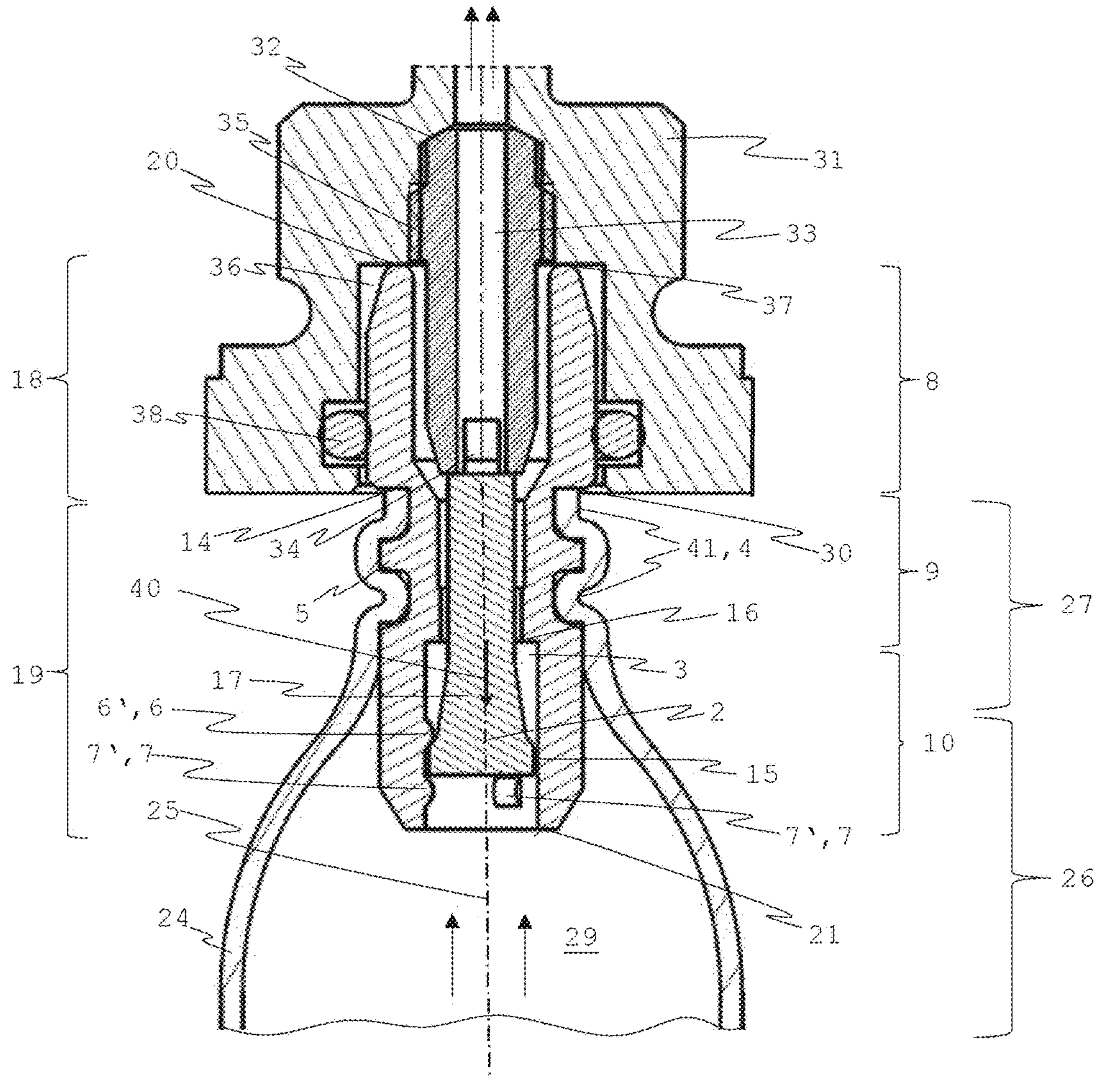
FIG. 10 shows a detailed view of a sectional view analogous to FIG. 9, wherein the connection region of the valve body is completely arranged in the gas container receptacle so that the valve tappet is arranged in an emptying position.

In contrast, FIG. 9 and FIG. 10 show a draining of the gas container 24 using an inlet valve 31 according to FIG. 8, which inlet valve 31 is arranged, for example, on a device for preparing cream or soda.

In detail, the inlet valve 31 according to FIG. 8 comprises a pin 32, which is held in the inlet valve 31 by means of a threaded connection 35, and a sealing element 38, which is arranged in a groove arranged in a gas container receptacle 36, wherein the gas container receptacle 36 has a diameter adapted to the connection region 18 of the valve body 1 and a stop surface 37 for limiting the travel path of the inlet valve 31 over the connection region 18. In this regard, the pin 32 has an inlet bore 33 as well as a transverse slot 34 for the flow of gas 29 from the gas container 24. The sealing element 38 is preferably an O-ring.

For this purpose, FIG. 9 shows that for emptying the gas container 24, the gas container receptacle 36 of the inlet valve 31 is arranged over the connection region 18 of the gas container 24 in such a way that the longitudinal axis 2 of the valve body 1 is aligned with a longitudinal axis of the pin 32 or a longitudinal axis of the gas container receptacle 36, wherein the pin 32 presses on the valve tappet 17 so that the latter is displaced in the direction of the gas container-side end face 21. The maximum displacement of the inlet valve 31 over the connection region 18 of the gas container 24 is limited by means of the stop surface 37 of the gas container receptacle 36, see FIG. 10, wherein the sealing element 38 rests against the circumferential surface of the connection region 18 so that any gas leakage is prevented. In this connection, it can also be seen in FIG. 10 that at a maximum displacement of the inlet valve 31 over the connection region 18 of the gas container 24, the stop surface 37 of the gas container receptacle 36 is in contact with the connection-side end surface 20 of the valve body 1.

In detail, the following steps are required to empty the gas container 24:

1. Arranging the inlet valve 31 over the connection region 18 of the valve body 1 of the valve 39 of the gas container 24, so that the connection region 18 of the valve body 1 projects into the gas container receptacle 35 of the inlet valve 31;
2. Sliding the inlet valve 31 over the connection region 18 until the connection-side end surface 20 of the connection region 18 abuts the stop surface 37 of the gas container receptacle 36, wherein the valve tappet 17 is pushed by the pin 32 of the inlet valve 31 toward the base body 26 of the gas container 24 via the first snap lug arrangement 6. The bulges 6' of the first snap lug arrangement 6 recede in this case elastically radially outwards, i.e. away from the longitudinal axis 2, when the valve tappet 17 moves in the longitudinal direction 40 and passes the bulges 6' with the thickening 42 having the maximum diameter 43. The end region of the conical thickening 42 of the valve tappet 17 having the maximum diameter 43 is thus positioned between the first snap lug arrangement 6 and the second snap lug arrangement 7 in the emptying position C, so that the valve tappet 17 is located in the emptying position C. A relatively large gap between the sealing edge 16 of the valve body 1 and the conical thickening 42 of the valve tappet 17 is given here, cf. FIG. 10.
3. Flow of gas 29 from the gas container 24 via the longitudinal bore 3 of the valve body 1 through the gap via the transverse slot 34 of the pin 32 into its inlet bore 33 through the inlet valve 31 (according to the drawn flow lines in FIG. 10), through which the gas 29 can be supplied to a device for preparing cream or soda, for example.

Figure 11:
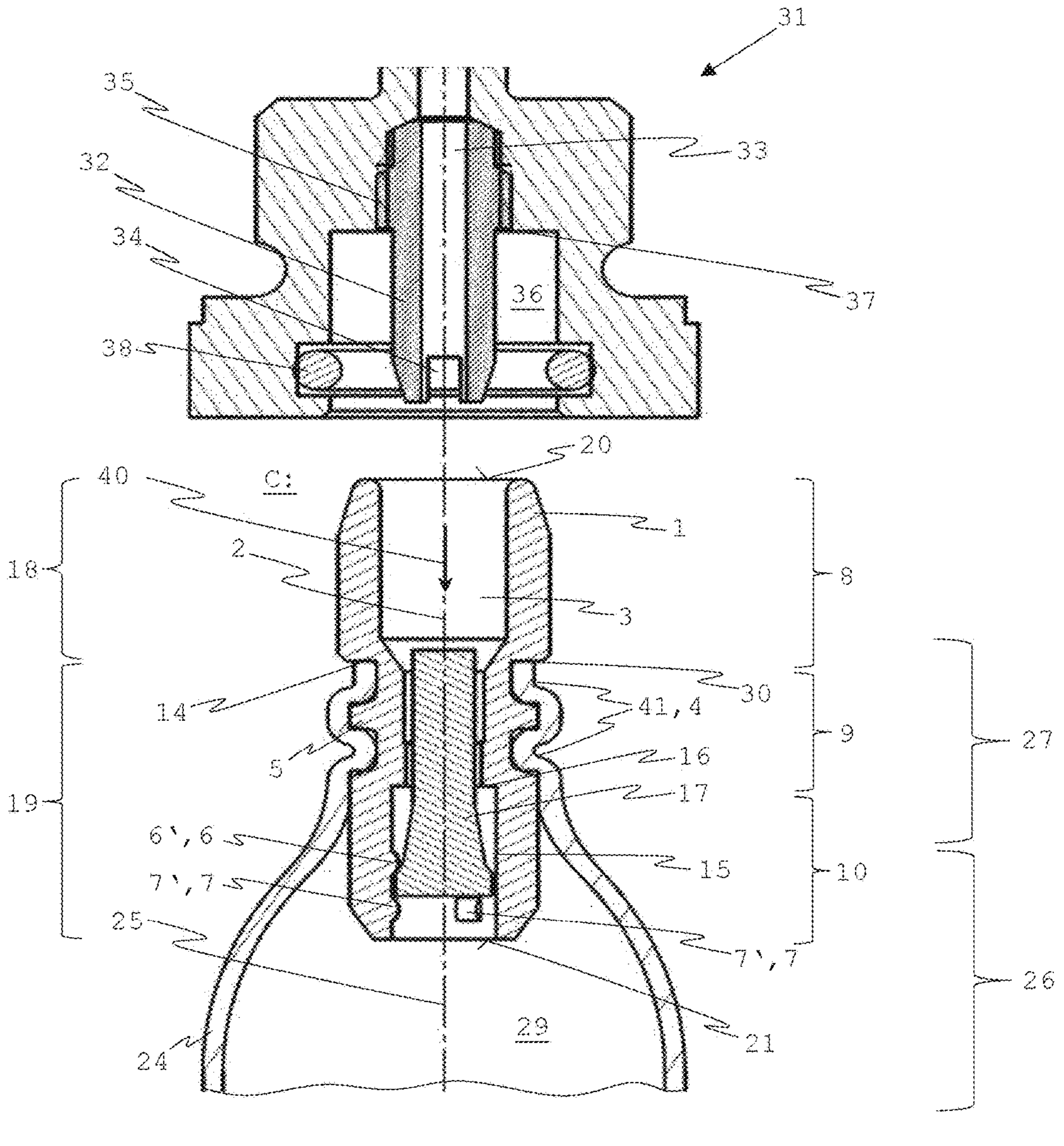
FIG. 11 shows a detailed view of a sectional view analogous to FIG. 10, wherein the connection region is no longer arranged in the gas container receptacle, but the valve tappet is still arranged in the emptying position.

FIG. 11 shows that after the gas container 24 has been emptied, the inlet valve 31 is separated from it again, with the valve tappet 17 or the end region of the conical thickening 42 remaining arranged between the first snap lug arrangement 6 and the second snap lug arrangement 7. This means that the valve tappet 17 remains in the emptying position C so that any refilling of the gas container 24 is not possible.

LIST OF REFERENCE SIGNS

1 Valve body;
2 Longitudinal axis of the valve body 1;
3 Longitudinal bore;
4 Double groove;
5 Sealing lug;
6 First snap lug arrangement;
6' Bulge of the first snap lug arrangement 6;
7 Second snap lug arrangement;
7' Bulge of the second snap lug arrangement 7;
8 First bore section of the longitudinal bore 3;
9 Second bore section of the longitudinal bore 3;
10 Third bore section of the longitudinal bore 3;
11 Diameters of the first bore section 8;
12 Diameters of the second bore section 9;
13 Diameters of the third bore section 10;
14 Stop surface;
15 Opening cross section of the third bore section 10;
16 Sealing edge;
17 Valve tappet;
18 Connection region;
19 Fastening region;
20 Connection-side end face;
21 Gas container-side end face;
22 Diameter of the connection region;
23 Diameter of the fastening region;
24 Gas container;
25 Longitudinal axis of the gas container 24;
26 Base body;
27 Base body head;
28 Opening;
29 Gas;
30 End face of the base body head 27;
31 inlet valve;
32 Pin;
33 Inlet bore of the pin 32;
34 Transverse slot of the pin 32;
35 Threaded connection;
36 Gas container receptacle;
37 Stop surface of the gas container receptacle 36;
38 Sealing element;
39 Valve;
40 Longitudinal direction;
41 individual groove;
42 Thickening;
43 Maximum diameter of the thickening 42;
A Filling position;
B Closing position;
C Emptying position;

The invention claimed is:

1. A valve for closing a gas container, the valve comprising a valve body having a continuous longitudinal bore along a longitudinal axis, wherein in the longitudinal bore, a displaceably guided valve tappet is mounted, wherein the valve body extends in a longitudinal direction parallel to the longitudinal axis from a connection region with a connection-side end face to a fastening region with a gas container-side end face, wherein the fastening region has a smaller diameter than the connection region and the connection region has a stop surface in order to provide a stop for a base body head of the gas container when the fastening region is inserted into the base body head through an opening thereof, wherein the valve body has a double groove on the circumferential surface in the fastening region, wherein the double groove comprises two individual grooves following one another in the longitudinal direction, which are separated from one another by a sealing lug facing away from the longitudinal axis, in order to permit gas-tight pressing of the base body head with the fastening region in a region of the double groove when the fastening region with the double groove is pushed into the base body head.

2. The valve according to claim 1, wherein the continuous longitudinal bore comprises at least three bore sections with at least two different diameters.

3. The valve according to claim 2, wherein at least a first bore section is arranged in the connection region and wherein at least a second and third bore section are arranged in the fastening region.

4. The valve according to claim 3, wherein the second bore section lying between the first bore section and the third bore section has a smaller diameter than the first bore section and the third bore section, wherein the valve tappet is displaceably mounted in the second bore section.

5. The valve according to claim 1, wherein the valve body has a first snap lug arrangement in the longitudinal bore in the fastening region, wherein by means of the first snap lug arrangement, a sectional narrowing of the longitudinal bore in the fastening region is ensured, and wherein the first snap lug arrangement has at least one bulge facing towards the longitudinal axis.

6. The valve according to claim 5, wherein the first snap lug arrangement comprises three bulges which are arranged, at least in sections, in a plane normal to the longitudinal axis.

7. The valve according to claim 6, wherein the three bulges of the first snap lug arrangement are arranged at an angular distance of 120° from each other in each case, wherein the angular distance is measured around the longitudinal axis.

8. The valve according to claim 5, wherein the valve body has a second snap lug arrangement in the longitudinal bore in the fastening region between the first snap lug arrangement and the gas container-side end face, wherein by means of the second snap lug arrangement, a further sectional narrowing of the longitudinal bore in the fastening region is ensured, and wherein the second snap lug arrangement has at least one bulge facing towards the longitudinal axis.

9. The valve according to claim 8, wherein the second snap lug arrangement comprises three bulges which are arranged at least in sections in a plane normal to the longitudinal axis.

10. The valve body according to claim 9, wherein the three bulges of the second snap lug arrangement are arranged at an angular distance of 120° from one another, wherein the angular distance is measured around the longitudinal axis.

11. The valve according to claim 8, wherein the bulges of the first and second snap lug arrangements, as seen along the longitudinal axis, are arranged congruent with each other or rotated by 60° with respect to each other.

12. The valve according to claim 5, wherein the valve tappet has a thickening which is directed towards the gas container-side end face, extends conically at least in sections and has, at least in sections, a maximum diameter which is greater than a diameter of a sectional constriction formed by the first snap lug arrangement.

13. The valve according to claim 12, wherein the maximum diameter of the thickening is larger than a diameter of a further sectional constriction formed by the second snap lug arrangement.

14. The valve according to claim 1, wherein the valve body is made of a high-temperature-resistant plastic.

15. The gas container having the valve according to claim 1, the gas container comprising a base body with the base body head having an opening, wherein the base body forms, at least in sections, an inner volume for receiving gas, wherein the fastening region with the double groove is inserted through the opening into the base body head and wherein the base body head is pressed in a gas-tight manner with the fastening region in the region of the double groove.

* * * * *